United States Patent [19]

Kobayashi et al.

[11] 4,104,077
[45] Aug. 1, 1978

[54] POROUS INORGANIC PRODUCT

[75] Inventors: Kazuaki Kobayashi, Fujisawa; Noboru Takaha, Tokyo; Masao Katsuragi, Hamura, all of Japan

[73] Assignees: The Yokohama Rubber Co., Ltd.; Nihon Cement Co., Ltd.; Asano Pole Co., Ltd., all of Tokyo, Japan

[21] Appl. No.: 740,793

[22] Filed: Nov. 11, 1976

[51] Int. Cl.$^2$ .............................................. C04B 7/32
[52] U.S. Cl. .................................... 106/88; 106/87; 106/89; 106/90; 106/98; 106/122; 252/62
[58] Field of Search .............. 106/86, 89, 90, 98, 106/104, 122, 87, 88; 252/62; 264/42

[56] References Cited

U.S. PATENT DOCUMENTS 3,247,294  4/1966  Sabouni ............................ 264/42
3,758,319  9/1973  Ergene ............................. 106/90

Primary Examiner—Lorenzo B. Hayes
Assistant Examiner—W. Thompson
Attorney, Agent, or Firm—Blanchard, Flynn, Thiel, Boutell & Tanis

[57] ABSTRACT

A porous inorganic product which is excellent in acoustic absorptivity and filtration efficiency and is high in strength is produced by bringing suitably sized organic foam particles, which have elasticity and can be shrunk greatly by heating or can be dissolved in a solvent, into contact with one another under pressure so as to deform each thereof, filling the gaps present between the organic foam particles with an inorganic binder such as cement, hardening the inorganic binder to form a hardened material, and shrinking the organic foam particles contained in the hardened material.

13 Claims, 11 Drawing Figures

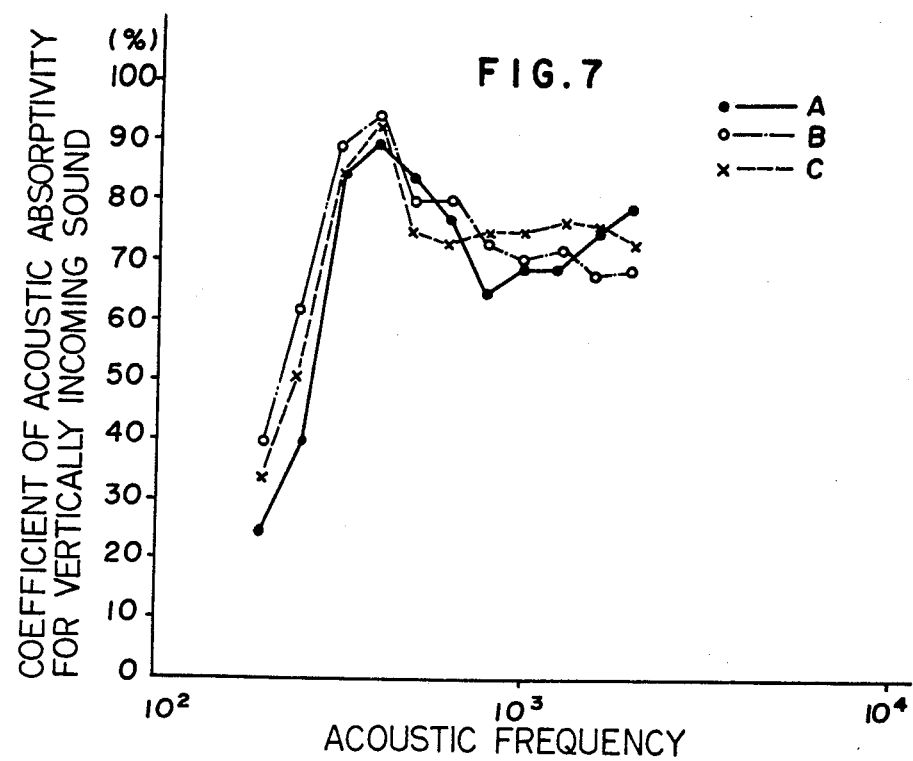
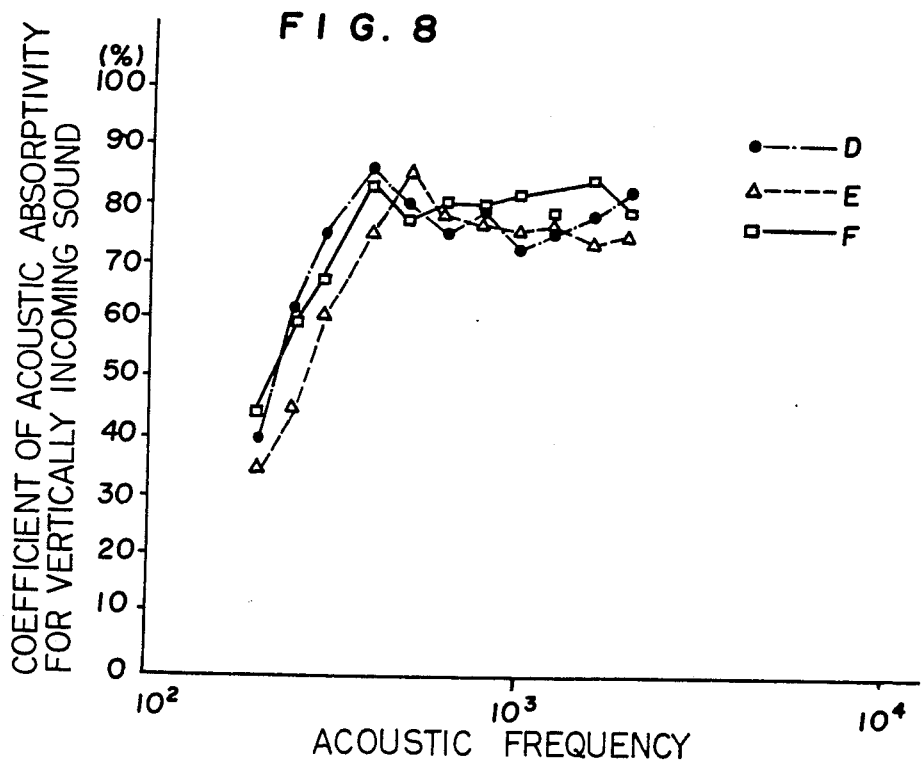

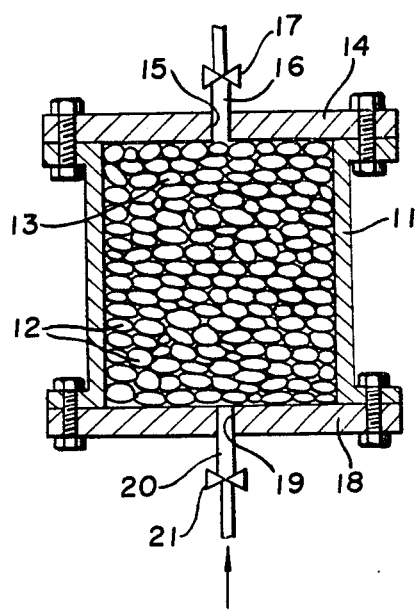
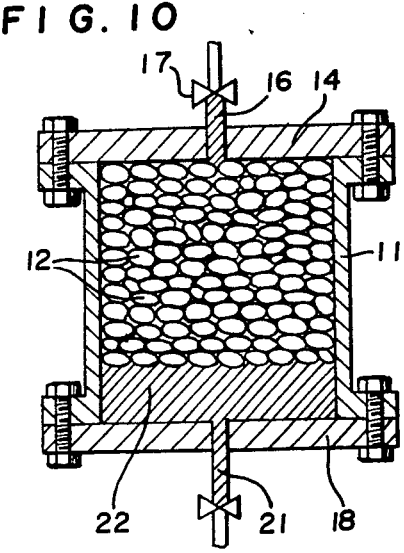
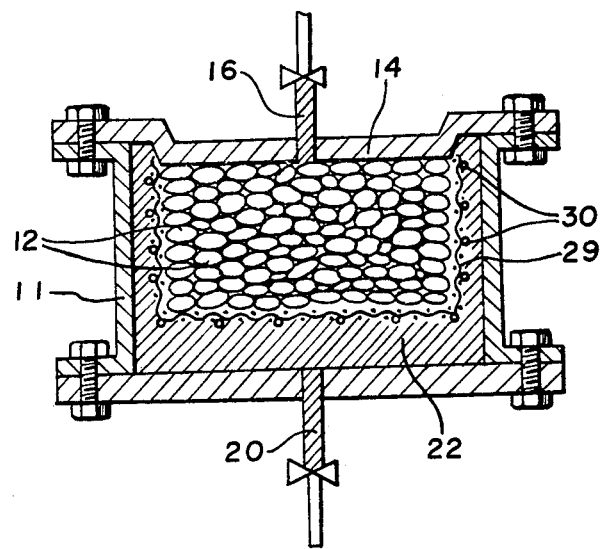

POROUS INORGANIC PRODUCT

BACKGROUND OF THE INVENTION

1. Field of the Invention

The present invention relates to a porous inorganic product having open cells therein and, more particularly, to a porous light weight, high strength inorganic product useful as an acoustic material or as a filter bed material and, in addition, having open cells whose wall area per unit volume is large.

2. Description of the Prior Art

The principal conventional methods of producing an inorganic member used as an acoustic material or as a filter bed material are as follows:

In the first method, a porous inorganic member is produced by adding a foaming agent or an air-entraining agent (surface active agent) to concrete, and then molding and curing the resulting mixture.

In the second method, a porous inorganic member is produced by mixing and molding an inorganic binder and organic foam particles, heating the molded mixture, and melting and removing the organic foam particles or thermally shrinking the same (U.S. Pat. No. 3,247,294).

In the first method, the porous inorganic member obtained has a number of cells of 1 mm or less in diameter and therefore contains a great number of cells therein. For this reason, the concrete layer inevitably becomes thin. In addition, these cells tend to locally gather thereby to form gaps which are relatively large in volume, irregular in shape and non-uniform. Thus the porous inorganic member obtained is low in strength and durability. Furthermore, the sound-absorbing or filtration capacity tend to considerably decrease, because the interconnecting holes are very small in sectional area and therefore liable to get clogged by dust and dirt.

In the second method, the porous inorganic member obtained has many closed cells and a relatively small number of open cells. In addition, the open cells interconnect with one another only through very narrow holes. Thus the porous inorganic member obtained in this method is very low in acoustic absorptivity and filtration capacity.

SUMMARY OF THE INVENTION

It is an object of the present invention to provide a porous inorganic product which is high in acoustic absorptivity and filtration capacity, and a method of producing the same.

It is another object of the present invention to provide a porous inorganic product in which many of the cells contained therein interconnect with adjacent cells through large contact or mating areas and these cells are distributed uniformly therein.

It is still another object of the present invention to provide a porous inorganic product which is high in strength and low in production cost.

BRIEF DESCRIPTION OF THE DRAWINGS

FIGS. 7 and 8 are graphs showing the relationship between acoustic frequency and coefficient of acoustic absorptivity for vertically incoming sound waves.

FIGS. 9, 10 and 11 are sectional views of molding apparatus.

Figure 1:
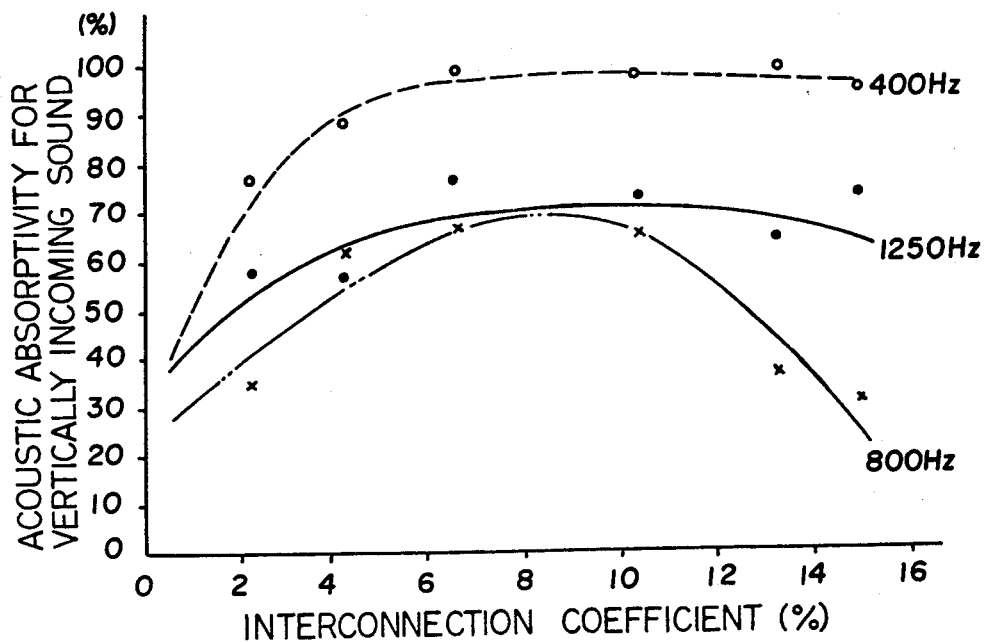
FIG. 1 is a graph showing the relationship between the interconnection coefficient and the acoustic absorptivity for vertically incoming sound waves.

The present invention is accomplished on the basis of the fact that a porous inorganic product having open cells of large sectional area which, in addition, is excellent in acoustic absorptivity and filtration capacity can be obtained by the following process:

First, suitable-sized organic foam particles of granular, chip-shape, rod-shape or the like, which either shrink in volume greatly by heating or dissolve in an organic or inorganic solvent, are packed into a pressure-tight mold under pressure so that the quantity of said particles in the mold is larger than the maximum possible quantity thereof that could be filled in the mold if the particles were rigid bodies (hereinafter referred to as the maximum packing density or quantity). Then, the gaps present between these packed particles are filled with an inorganic binder. After the inorganic binder has hardened, the volume of the organic foam particles is reduced.

In the above process, the organic foam particles used are preferably polystyrene foam particles, polyethylene foam particles, etc. and, in addition, thermoplastic or thermosetting resin particles which shrink in volume greatly when heated, or resin particles which are soluble in an organic or inorganic solvent can be used.

The size of the organic foam particles has the following restrictions determined by the size or volume of the cells to be formed:

If the organic foam particles are spherical and the cells to be formed are 1 mm or less in diameter or size, that is, 0.52 mm$^3$ or less in volume, the porous inorganic member produced will be low in strength and therefore it is not suitable for practical use. If the cells are 20 mm or more in diameter or size, that is, 4200 mm$^3$ or more in volume, the lower limit of the frequencies of sound that can be absorbed by the porous organic member will be lower than the audio frequency range, but such a low value of the lower limit is not necessary for practical use.

The organic foam particles may be uniform in size, a combination of particles different in size, or a combination of particles different in shape.

As the inorganic binder there is used, for instance, mortar concrete produced by suitably mixing Portland cement or alumina cement, gypsum, α-alumina, etc. with aggregates such as clay, sand, quick lime, and silica, which can be molded and hardened at room temperature and is not changed by heating or in a solvent.

The mixing ratio between the organic foam particles and the inorganic binder is determined in consideration of the ratio between the volume of the cells present in the porous inorganic product and that of the inorganic binder, and is usually in the range from 1.5: 1 to 4: 1 by volume.

In order to force the organic foam particles into the mold and to fill the gaps between the organic foam particles with the inorganic binder, the following three methods are usually adopted:

The first method is to mix the organic foam particles with the inorganic binder and then force the resulting mixture into the mold. The second method is to fill the mold with the organic foam particles first and then feed the inorganic binder into the mold. The third method is to preliminarily mold the organic foam particles into a molding having a density greater than the maximum packing density, put the molding into a mold, and then to feed the inorganic binder into the mold under pressure.

Shrinkage of the organic foam particles is carried out by heating the hardened object when the binder is hardened, to a temperature higher than the melting point of the organic foam particles contained therein, or by spraying a solvent, which can dissolve the organic foam particles, on the hardened object or by immersing the hardened object in the above solvent.

In this case, any solvent may be used so long as it can dissolve the organic foam particles. For instance, toluene or methylene chloride may be used.

As will be hereinafter described in detail, the sound-insulating function of the porous inorganic product according to the present invention is considered to be created not by frictional attenuation due to the viscous resistance of air existing in the cells or by attenuation of vibration of the porous inorganic product itself but by attenuation of acoustic energy due to complicated resonance phenomena.

In general, an acoustic material attenuates the energy of incoming sound waves by converting the energy into heat, vibration, etc. The acoustic absorptivity $\alpha$ is defined by the equation $$\alpha = 1 - (I'/I_o)$$

where $I_o$ is the energy of incoming sound, and $I'$ is the energy of reflected sound. Therefore, it can be said that the sound-absorbing performance becomes higher with the decrease of reflected sound.

Next, the relationship between the interconnection coefficient and acoustic absorptivity of the porous inorganic product will be obtained as follows:

The interconnection coefficient is defined as the sum of the areas of the open cells interconnecting with the cells directly open to a given sectional plane of the organic foam member divided by the area of the above-mentioned sectional plane.

First, the organic foam particles are selected so that the grain size thereof may fall within a range of 5.0 ± 1.3 mm. Then, the organic foam particles thus selected are mixed with mortar made of Portland cement. The resulting mixtures are forced into molds under various pressures to form various kinds of moldings. After hardening these respective moldings, the hardened moldings are heated respectively to melt the organic foam particles contained therein thereby producing various porous inorganic members different in interconnection coefficient. Then, sound waves having wavelengths of 400 Hz, 800 Hz and 1,250 Hz are applied vertically to each of these porous inorganic members. From the results of this experiment, the energy of reflected sound waves was obtained, and then the acoustic absorptivity for vertically incoming sound waves was obtained according to the above-mentioned equation. FIG. 1 shows the relationship between the interconnection coefficient and the acoustic absorptivity for vertically incoming sound waves.

As is apparent from FIG. 1, the acoustic absorptivity is high for sounds of all frequencies when the interconnection coefficient is in the range of 0.5% to 15%, especially when it is in the range of 5% to 11%.

An acoustic material having a simple resonance type sound-absorbing mechanism is generally characterized in that the sound-absorbing characteristic curve thereof for showing the relationship between the size of the resonance box and the acoustic absorptivity for a given frequency is generally not flat and shows that a slight change of the size of the resonance box causes a radical change of the acoustic absorptivity. On the other hand, the porous inorganic product according to the present invention has a rather stable acoustic absorptivity, as mentioned above, which is subject to only a slight change even when the sound wave frequency is changed if the interconnection coefficient is in a specified range. Therefore, it is thought that the porous inorganic product performs complicated resonance phenomena.

Figure 2:
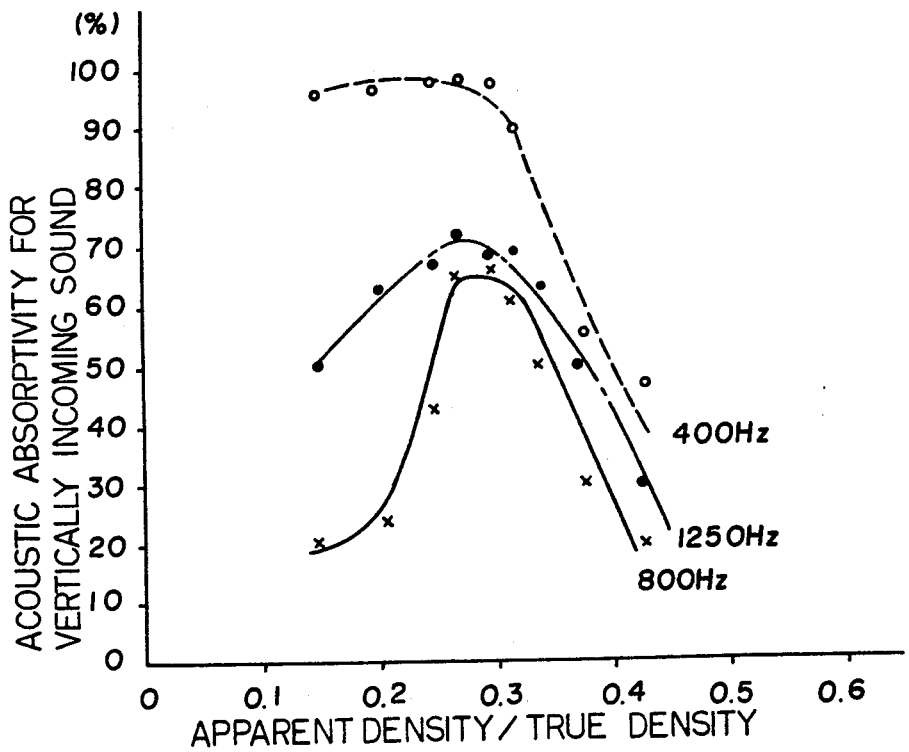
FIG. 2 is a graph showing the relationship between the ratio of apparent density/true density and the acoustic absorptivity for vertically incoming sound waves.

In addition, the acoustic absorptivity of the porous inorganic product of the present invention is also influenced by the porosity thereof. In order to evaluate the relationship between the acoustic absorptivity and the porosity of the porous inorganic product of the present invention, tests were conducted to obtain the acoustic absorptivity for vertically incoming sound waves relative to the ratio between the apparent density and true density of the porous inorganic product. FIG. 2 shows the results of these tests.

From FIG. 2, it is understood that sound-absorbing effects are observed when the ratio between the apparent density and true density of the porous inorganic product falls within a range of 0.15 to 0.5; and especially when the ratio is in the range of 0.2 to 0.4, the sound-absorbing effects are remarkable for almost all the frequency range.

The above description is made with reference to the use of organic foam particles which are substantially uniform in size. However, particles that are different in size may be mixed.

Examples of the product of the present invention and the relationship between the frequency of sound applied to the product of the present invention and the acoustic absorptivity for vertically incoming sound waves will be hereinafter described with reference to the drawings.

Figure 3:
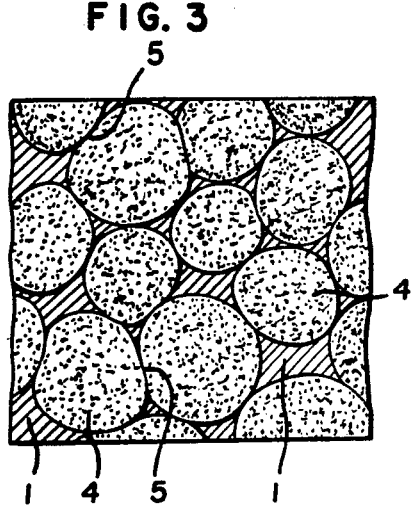
FIG. 3 is a sectional view taken along a plane parallel to the surface of a part of the molding produced by introducing a mixture of cement mortar and foam particles into a mold.
Figure 4:
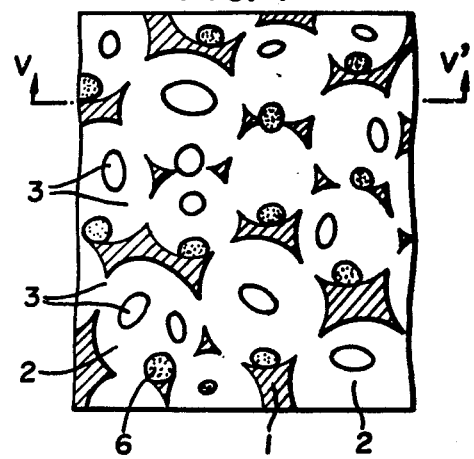
FIG. 4 is a view corresponding to FIG. 3 and showing the condition after the mortar has been hardened and the foam particles have been melted.

FIG. 3 is a sectional view taken along a plane parallel with the surface of a part of a molding produced by introducing a mixture of cement mortar and foam particles which are uniform in size into a mold under pressure; and FIG. 4 is a sectional view taken along a plane parallel with the surface of a part of the porous inorganic product (hereinafter referred to as Sample A) according to one embodiment of the present invention produced by curing the molding shown in FIG. 3 to harden the cement mortar, and by heating the resulting product obtained when the cement mortar has been hardened thereby to melt the organic foam particles contained therein.

In FIGS. 3 and 4, reference numeral 1 designates the inorganic binder, and 2 designates cells obtained by forcing a mixture of organic foam particles 4 and the inorganic binder 1 into a mold under pressure thereby deforming the individual organic foam particles to bring them into contact with one another through wide boundary areas 5 (the boundary area would be very narrow if no pressure is applied.), and then by shrinking the organic foam particles 4 after the inorganic binder 1 such as mortar is hardened. Reference numeral 3 designates interconnecting holes between the open cells 2, and numeral 6 designates residues of the organic foam particles 4 appearing after shrinkage of the particles.

Figure 5:
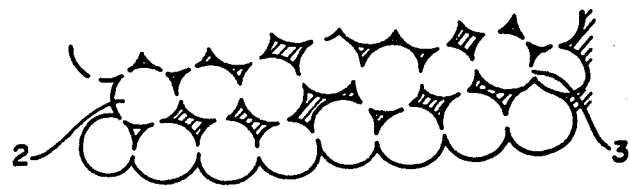
FIG. 5 is a sectional view taken along line V-V' of FIG. 4.

FIG. 5 is a sectional view taken along V–V' line of FIG. 4, showing how the open cells 2 are interconnected with one another through the interconnecting holes 3.

Figure 6:
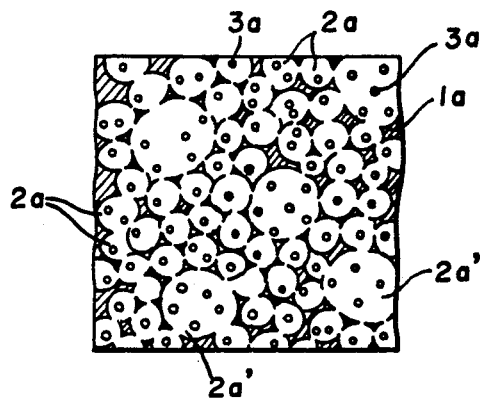
FIG. 6 is a sectional view of a modified product.

FIG. 6 is a longitudinal sectional view of a product (hereinafter referred to as Sample B) of the present invention produced by preparing a mixture containing organic foam particles of 5 mm in diameter, 10% by volume of organic foam particles of 12 mm in diameter with respect to the volume of the foam particles of 5 mm in diameter, and cement mortar, and by processing the above mixture according to the method described with reference to FIGS. 3 and 4.

In FIG. 6, 1a designates the inorganic binder such as mortar, 2a designates cells, 2a' designates cells large in diameter produced from the organic foam particles large in diameter, and 3a designates interconnecting holes.

The method of producing the porous inorganic product described with reference to FIG. 6 is also applied to the production of Samples C, D, E and F.

Sample C is a porous inorganic product provided with larger cells, produced by using a mixture containing organic foam particles of 5 mm in diameter as the main component and large-diameter organic foam particles the volume of which corresponds to 10% of the volume of the cells obtained from the above main component particles.

Sample D is a porous inorganic product provided with strap-shaped cells, by using a mixture containing organic foam particles of 5 mm in diameter and 10% by volume of strap-shaped organic foam particles of 3 mm in diameter and 40 mm in height with respect to the volume of the above 5 mm particles.

Sample E is a porous inorganic product provided with cells obtained from organic foam particles 5 mm in diameter and, in addition, having longitudinal blind holes 5 mm in diameter obtained from cylindrical organic foam particles inserted thereinto and having a total sectional area corresponding to 5% of the surface area thereof.

Sample F is a porous inorganic product provided with cells obtained from organic foam particles 5 mm in diameter and, in addition, having rugged surfaces provided by pressing it with a male mold having triangular grooves thereon.

FIGS. 7 and 8 show the relationship between the acoustic absorptivity for vertically incoming sound waves and the acoustic frequency regarding Samples A, B, C, D, E and F.

It is understood from these figures that sound-absorbing effects are recognized for the entire frequency range, especially when the interconnection coefficient is in the range of 5 to 11% and that the porous inorganic member according to the present invention has a complicated sound-absorbing mechanism of resonance type.

It is also known from these figures that, compared with Sample A having fundamental cells obtained from organic foam particles which are substantially uniform in diameter, Samples B, C, D and E provided with spherical, rectangular-parallelepiped-shaped, strap-shaped cells and longitudinal holes larger in volume than the basic cells, respectively, are slightly improved in acoustic absorptivity.

Next, the second method of producing the porous inorganic product according to the present invention, according to which the mold is first filled with organic foam particles and then an inorganic binder is forced into the mold under pressure, will be hereinafter described in detail with reference to the accompanying drawings.

FIG. 9 is a longitudinal sectional view of a molding flask filled with organic foam particles until the density thereof exceeds the maximum packing density; and FIG. 10 is a longitudinal sectional view of a molding flask which is first filled with organic foam particles so that the density thereof may not exceed the maximum packing density and then is supplied with an inorganic binder under pressure.

In FIG. 9, Reference numeral 11 designates a molding flask provided with a lid 14 at the top. Organic foam particles 12 are charged into the molding flask 11 by opening the lid 14 so that the density thereof may become greater than the maximum packing density. For instance, the molding flask 11 having a volume of 80 l is filled with particles of foamed styrene 1.1 times as much as the volume of the molding flask 11 under pressure and then the lid 14 is closed. In this case, particles of foamed styrene are more or less deformed and therefore are brought into surface contact with one another. The lid 14 is provided with an overflow hole 15 to which a pipe 16 equipped with a stop valve 17 is connected. The molding flask 11 is provided with a base plate 18 having an inlet 19 for the inorganic binder. A pipe 20 for feeding the inorganic binder provided with a stop valve 21 is connected to the inlet 19.

With the lid 14 mounted and the stop valves 17 and 21 kept open, the inorganic binder 22 such as cement mortar and cement slurry is fed into the molding flask 11 through the feeding pipe 20 by the action of a pump (not shown) or the like. The inorganic binder 22 thus fed under pressure fills gaps present among the organic foam particles and overflows through the overflow hole 15 and the pipe 16. When the inorganic binder 22 starts overflowing through the pipe 16, the stop valve 17 is closed; and when the feeding of the inorganic binder 22 is completed, the stop valve 21 is closed.

Then the inorganic binder in the molding flask 11 is cured in air under ambient conditions until it can be released from the molding flask 11. However, after it is released from the molding flask 11, it may be cured in water or in steam at low temperatures so as to increase the strength of the hardened product.

After the inorganic binder is half or more hardened, it is released from the molding flask and then is either cured at high temperatures and pressures or immersed in a solvent to shrink or dissolve the organic foam particles in contact with one another thereby to produce open cells. Thus a porous inorganic member having open cells therein can be obtained.

According to the present invention, organic foam particles are first introduced in a molding flask and therefore are kept in direct contact with one another and at uniform and stable conditions. Accordingly, special pressure equipment is not required and, in addition, the period of preliminary curing has no special restrictions. Therefore the production process can be made simple and, moreover can mold a large product of complicated shape and high in dimensional accuracy. Since the product has many open cells having a large total wall area and, in addition, is uniform, low in specific gravity and high in strength, it is advantageously used as an acoustic material, a filter bed material, a heat-insulating material, a condensation deposition preventing material, etc.

In producing sound-insulating boards to be erected along both sides of an express-highway, high-speed railway, etc. so as to absorb and insulate noise, the present invention may be applied as follows:

First, the organic foam particles 12 are placed in the molding flask 11 in smaller quantity than the maximum packing quantity with the top part of the molding flask being left unfilled. Then, the inorganic binder 22 is fed in the closed molding flask 11 under pressure, where it makes the organic foam particles float thereon because of the difference between the specific gravity thereof and that of the organic foam particles. Then the inorganic binder 22 overflows through the overflow hole 15 and the pipe 16. When the inorganic binder 22 begins to overflow through the pipe 16, the stop valve 17 is closed. After closing the valve 16, the inorganic binder 22 is further fed into the molding flask 11 under pressure, and thereby the organic foam particles 12 are gathered together at the top part of the molding flask 11 and are brought into strong and surface contact with one another. Thus a layer of the inorganic binder 22 containing no foam particles 12 is formed at the bottom part of the molding flask 11. When feeding of the inorganic binder 22 is completed, the stop valve 21 is closed. When the inorganic binder 22 is half or more hardened, the hardened object is released from the molding flask 11. Then the organic foam particles are shrunk. Thus a composite board, which consists of an upper porous inorganic layer having open cells and a lower non-porous layer, can be obtained. In other words, a sound-insulating board can be produced which consists of a sound-absorbing layer and a sound-insulating layer as an integral unit.

The above-mentioned non-porous layer 22 may be provided, if necessary, with wire gauze or wire gauze reinforced by steel bars and, in addition, gravel mixed therein so as to obtain a composite board of high strength. The method of producing such a composite board will be described with reference to FIG. 11, which is a longitudinal sectional view of the molding flask. In the drawing, reference numeral 29 designates a basket-shaped wire gauze and reference numeral 30 designates steel bars. First, the wire gauze 29 is placed in the molding flask 11 to form a container, which is then filled with organic foam particles. After the lid 14 is closed, the composite board is produced according to a method similar to that described with reference to FIGS. 9 and 10.

This method can form a composite board having porous and non-porous layers divided by a more clear-cut boundary surface; and, in addition, it can provide the non-porous layer also along the circumference of the porous layer, as shown. Because of this structure in addition to the reinforcement by gauze and steel bars, the relatively brittle non-porous layer can be increased in strength and is prevented from cracking.

Thus the present invention can produce a composite concrete board consisting of a porous layer having open cells and a non-porous layer of fine structure integrally and simultaneously formed, and therefore can produce an inexpensive and strong composite board. Moreover, according to the present invention, the interconnection coefficient can be easily controlled by adjusting the shape and hardness of the organic foam particles, the feeding pressure of the inorganic binder, and the like. The composite concrete board produced according to the present invention can be used not only as a sound-absorbing board or a sound-insulating board for prevention of noises, but also as a material for general building or construction purpose.

PREFERRED EMBODIMENTS OF THE INVENTION

EXAMPLE 1

An inorganic binder and organic foam particles were fully mixed in a mixer according to the ratio shown in Table 1 to form a mixture, which was then placed in a mold of 98 mm in diameter and 100 mm in height and was compressed and packed by a cylinder at a pressure of 1.0 kg/cm$^2$ in the compression molding process. After molding, the mixture was cured at room temperature for two days until it attained a semi-hardened state. The semi-hardened mixture was heated and pressurized at a temperature of 143° C and a vapor pressure of 3 kg/cm$^2$ for 60 minutes to thermally shrink the organic foam particles. The product thus produced, which is identified as Sample A, has cells 2 substantially uniformly formed at the positions previously occupied by the organic foam particles of 5 mm in diameter.

TABLE 1

Portland cement: 220 g
Sand (2.83mm sieve, undersize 95%): 220 g
Water: 90 g
Air-entraining agent: 0.132 g
Foamed styrene beads (5 mm in dia.): 637 cm$^3$

EXAMPLE 2

A porous inorganic product was produced according to the same procedure as that described in Example 1 using a mixture in the mixing ratio as shown in Table 2. The thus obtained product (which is referred to herein as sample B) as shown in FIG. 6 contains distributed therein many cells of small diameter 2a which were formed at the positions that were occupied by the organic foamed particles of 5 mm in diameter and many cells of large diameter 2a' which were formed at the positions that were occupied by the foamed particles of 12 mm, in every place therein.

TABLE 2

Portland cement: 220 g
Sand (2.83mm sieve, undersize 95%): 220 g
Water: 90 g
Air-entraining agent: 0.132 g
Foamed styrene beads (5 mm in diameter): 537 cc
Foamed styrene beads (1.2 mm in diameter): 64 cc

EXAMPLE 3

A porous inorganic product was prepared according to the same procedure as that described in Example 1 except that a cylindrical styrene block of 78 mm in diameter by 16 mm in height was buried into the mixture obtained in the procedure of Example 1.

The thus obtained product (which is referred to herein sample C) contains the cells which were formed at the positions that were occupied of styrene beads of 5 mm in diameter and a cavity which was formed at the position that was occupied by the block.

EXAMPLE 4

A porous inorganic product was prepared according to the same procedure as that described in Example 1 using a mixture of the following ingredients which were mixed in the mixing ratio as shown in Table 3. The thus obtained product (which is referred to herein sample D) had cells which were formed at the positions which were occupied by the styrene beads of 5 mm in diameter and a long hole which was formed at the place which was occupied of the styrene of strap shape.

TABLE 3

Portland cement: 220 g
Sand (2.83 mm sieve, undersize 95%): 220 g
Air entraining agent: 0.132 g
Foamed styrene beads (sphere of 5 mm in diameter): 554 cc
Foamed styrene of strap in shape (3 mm of diameter × 40 mm in height): 83 cc

EXAMPLE 5

A porous inorganic product was prepared according to the same procedure as that described in Example 1 except that a foamed styrene of stick shape of 5 mm in diameter and 96 mm in length was inserted into the mixture obtained by the step of admixing the starting materials in the process of Example 1 perpendicularly from the upper part of the mold and the end surface of the foamed styrene stick was exposed at the surface of the admixed materials.

The thus obtained product (which is referred to herein sample E) had cells which were formed at the places that were occupied of the foamed styrene beads and a vertical hole opening through the upper end thereof which was formed at the place that was occupied by the styrene stick.

EXAMPLE 6

This example used a female mold 98 mm in diameter and 100 mm in height and a male mold having triangular projections on the surface thereof. Other requirements were the same as in the case of Example 1.

The product (which is referred to herein Sample F) thus produced has, on its surface, recesses corresponding to the truncated-cone-shaped projections on the male mold surface.

Table 4 is a list of cell distribution, interconnection coefficient, apparent density and the ratio of apparent density to true density, for Samples A to F thus obtained.

The sound-absorbing characteristics of Samples A to F were examined and are shown in FIGS. 7 and 8. FIG. 1 shows the relationship between the interconnection coefficient of Sample A and the acoustic absorptivity thereof for vertically incoming sound waves, regarding frequencies of 400 Hz, 800Hz and 1,250 Hz.

Table 4

| Sample | Distribution of cells | Inter-connection coefficient | Apparent density | Apparent density / True density |
|---|---|---|---|---|
| A | 5 mm in dia. | 6.3% | 0.70 | 0.33 |
| B | 5mm in dia. 90% 12mm in dia. 10% | 7.5% | 0.70 | 0.33 |
| C | 5mm in dia. 90% Hollow parts 10% | 6.3% (Excluding hollow parts) | 0.63 (Including hollow parts) | 0.30 |
| D | 5mm in dia. 90% Strap-shaped 10% (3mm in dia. and 40mm in height) | 8.1% | 0.70 | 0.33 |
| E | 5mm in dia. 95% Cylindrical recess 5mm in dia. 5% | 6.5% (Excluding hollow parts) | 0.50 (Including hollow parts) | 0.23 |
| F | 5mm in dia. Rugged surface | Surface 7.8% Inside 6.5% | 0.58 | 0.27 |

Note 1) True density : 2.13 for all samples
Note 2) Sample size : 98 mm in dia. and 100 mm in height It is understood from FIG. 1 that the acoutic absorptivity is very low for all frequencies when the interconnection coefficient is 0.5% less; and, when the interconnection coefficient is 15% or more, the acoustic absorptivity is relatively high for the relatively low frequency range, but is low for the high frequency range higher than 800 Hz.

Thus, it is also known from FIG. 1 that the acoustic absorptivity is excellent for all the frequencies when the interconnection coefficient is in the range of 5% to 11%.

FIG. 2 shows the relationship between the ratio of apparent density to true density of Sample A and the acoustic absorptivity thereof for vertically incoming sound waves, regarding frequencies of 400 Hz, 800 Hz and 1,250 Hz. It is apparent from FIG. 2 that the acoustic absorptivity is very low when the ratio of apparent density to true density is 0.15 or less and 0.5 or more, and that it is very high when the ratio is in the range of 0.25 to 0.35.

EXAMPLE 7

A mixture of the following ingredients which were admixed uniformly in the mixing ratio as shown in Table 3 was charged into a mold and formed into the predetermined shape under a forming pressure of 1 Kg/cm$^2$. The obtained product was dried and heated and sintered at 1560° C.

TABLE 5

α-alumina: 100 g
(density: 3.97): (volume: 25ml)
Foamed styrene beads: 25 ml
(sphere of 3mm in diameter): (equivalent volume to that % α-alumina)
Water: 25 g The thus obtained porous member had the properties shown in Table 6.

TABLE 6

Apparent density: 1.0366
Ratio of apparent density to real density (density of α-alumina was 3.97): 0.26
Mean diameter of cells: 3.0 mm
Interconnection coefficient: 4.90%

The obtained porous member was able to withstand high temperatures of up to 1600° C and is useful as a gas filter at high temperature and as a muffler of a motor car. Also it is useful for exhaust openings and exhaust pipes of a sintering furnace or a melting furnace to prevent noises at high temperature.

EXAMPLE 8

Into a mold of 100 l of interior capacity (100 cm length by 100 cm width by 10 cm high), 61.6 liters of foamed styrene beads (diameter of which was about 5 mm) were charged under no pressure and then the mold was covered with the lid. 44.04 liters of cement slurry were poured into the mold from the bottom thereof under 4 kg/cm$^2$ of pouring pressure.

Composition of the cement slurry was as shown in the following Table 7.

TABLE 7

Cement: 1037 kg
Fly ash: 259 kg
Water: 519 kg
Subtractive water agent: 2.6 kg

After pouring cement slurry into the mold, the resultant mixture was kept at 60° C for 5 hours in steam and then the resultant product was taken out from the mold. Further the product was kept at 160° C for hours by steaming to thereby reduce the volume of the foamed styrene beads and then a combined board of 10 cm in depth by 100 cm in length by 100 cm in width consisting of a porous layer of 7 cm in depth and a non-porous layer of 3 cm in depth was obtained. The apparent density of the porous layer was 0.6 and that of the non-porous layer was 3.0 and that of the combined board was 0.98.

The acoustic absorptivity of the above mentioned combined board was measured under the conditions shown in Table 8.

Measuring method: according to JIS A 1405
Frequency of vibration of sound: 200 – 2000 HZ
Incidence angle: vertically incoming sound It was recognized from these above mentioned tests that the composite concrete boards produced according to the present invention were excellent in acoustic absorptivity and sound insulating ability.

The embodiments of the invention in which an exclusive property or privilege is claimed are defined as follows:

1. A porous, inorganic, molded product, comprising a matrix of molded, shape-retaining, inorganic binder, said binder having substantially uniformly distributed therein a multiplicity of open interconnecting cells wherein each of said cells has a volume of from 0.52 mm$^3$ to 4200 mm$^3$, said open cells being interconnected by holes so that the interconnection coefficient of said product is from 0.5 to 15%, wherein the interconnection coefficient is defined as the sum of the areas of the holes that communicate with the cells that are directly intersected by an imaginary cross-sectional plane through said product divided by the area of that plane, the ratio of $$\frac{\text{apparent density of said product}}{\text{true density of said binder}}$$

being in the range of 0.15 to 0.5.

2. A porous inorganic molded product as set forth in claim 1 wherein said binder is selected from the group consisting of (1) a mixture of cement and aggregate, and (2) alumina.

3. A porous inorganic molded product as set forth in claim 1 wherein said cells are substantially spherical in shape.

4. A porous, inorganic, molded product as set forth in claim 1 wherin said product has a roughened surface.

5. A porous, inorganic, molded product as set forth in claim 1 wherein the volume ratio of $$\frac{\text{said cells}}{\text{said binder}}$$

is in the range of (1.5/1) to 4/1.

6. A porous, inorganic, molded product as set forth in claim 1 wherein said interconnection coefficient is from 5 to 11% and the ratio of $$\frac{\text{apparent density of said product}}{\text{true density of said binder}}$$

is from 0.2 to 0.4.

7. A porous, inorganic, molded product, comprising a matrix of molded, shape-retaining inorganic binder, said binder having substantially uniformly distributed therein a multiplicity of open interconnecting cells, said cells comprising a mixture of first and second cells wherein said first cells each have a volume of from 0.52 mm$^3$ to 4200 mm$^3$ and said second cells have a larger volume than said first cells, said open cells being interconnected by holes so that the interconnection coefficient of said product is from 0.5 to 15%, wherein the interconnection coefficient is defined as the sum of the areas of the holes that communicate with the cells that are directly intersected by an imaginary cross-sectional plane through said product divided by the area of that plane, the ratio of $$\frac{\text{apparent density of said product}}{\text{true density of said binder}}$$

being in the range of 0.15 to 0.5.

8. A porous, inorganic, molded product as set forth in claim 7 wherein said binder is selected from the group consisting of (1) a mixture of cement and aggregate, and (2) alumina.

9. A porous, inorganic, molded product as set forth in claim 7 wherein said first and second cells are substantially spherical in shape.

10. A porous, inorganic, molded product as set forth in claim 7 wherein said first cells are substantially spherical in shape and said second cells are strap-shaped.

11. A porous, inorganic, molded product as set forth in claim 7 wherein said second cells extend from the exterior surface of said product into the interior thereof.

12. A porous, inorganic, molded product as set forth in claim 7 wherein the volume ratio of $$\frac{\text{said cells}}{\text{said binder}}$$

is in the range of 1.5/1 to 4/1.

13. A porous, inorganic, molded product as set forth in claim 7 wherein said interconnection coefficient is from 5 to 11% and the ratio of $$\frac{\text{apparent density of said product}}{\text{true density of said binder}}$$

is from 0.2 to 0.4.

* * * * *